(12) United States Patent
Sasaki

(10) Patent No.: US 7,660,518 B2
(45) Date of Patent: Feb. 9, 2010

(54) AUTOMATIC FOCUSING APPARATUS

(75) Inventor: Tadashi Sasaki, Saitama (JP)

(73) Assignee: Fujinon Corporation, Saitama-shi (JP)

( * ) Notice: Subject to any disclaimer, the term of this patent is extended or adjusted under 35 U.S.C. 154(b) by 553 days.

(21) Appl. No.: 11/480,396

(22) Filed: Jul. 5, 2006

(65) Prior Publication Data

US 2007/0019940 A1    Jan. 25, 2007

(30) Foreign Application Priority Data

Jul. 21, 2005  (JP) .............................. 2005-211689

(51) Int. Cl.
*G03B 3/10* (2006.01)
*G03B 17/00* (2006.01)
(52) U.S. Cl. ....................... 396/121; 396/79
(58) Field of Classification Search .................. 396/52, 396/55, 79, 121, 123, 124; 348/208.4, 208.12, 348/208.14, 345, 348, 350, 352
See application file for complete search history.

(56) References Cited

U.S. PATENT DOCUMENTS

| | | | |
|---|---|---|---|
| 5,210,566 A | 5/1993 | Nishida | |
| 5,418,595 A | 5/1995 | Iwasaki et al. | |
| 5,422,673 A | 6/1995 | Kondo et al. | |
| 5,552,823 A | 9/1996 | Kageyama | |
| 2006/0066744 A1 * | 3/2006 | Stavely et al. | ............... 348/352 |

FOREIGN PATENT DOCUMENTS

| | | |
|---|---|---|
| GB | 2 209 901 A | 5/1989 |
| JP | 64-71382 | 3/1989 |
| JP | 1-231578 | 9/1989 |
| JP | 2663451 B2 | 6/1997 |
| JP | 2675807 B2 | 7/1997 |

* cited by examiner

*Primary Examiner*—Rodney E Fuller
(74) *Attorney, Agent, or Firm*—Birch, Stewart, Kolasch & Birch, LLP

(57) ABSTRACT

An automatic focusing system comprises: a region configuring device which configures a main subject region including a main subject within a photographing screen; a focusing control device which controls focusing so that a focus state of the main subject is a best focus state; a focus state obtaining device which divides the photographing screen into a plurality of regions and obtains a focus state from each region; a device storing the focus state obtained from each region; a movement detecting device which references the stored focus state of each region to detect the movement of a group of regions located either within the main subject region and its vicinity or within the main subject region and are in a best focus state; and a region moving device which moves the main subject region in accordance with the movement of the group of regions that are in the best focus state.

12 Claims, 8 Drawing Sheets

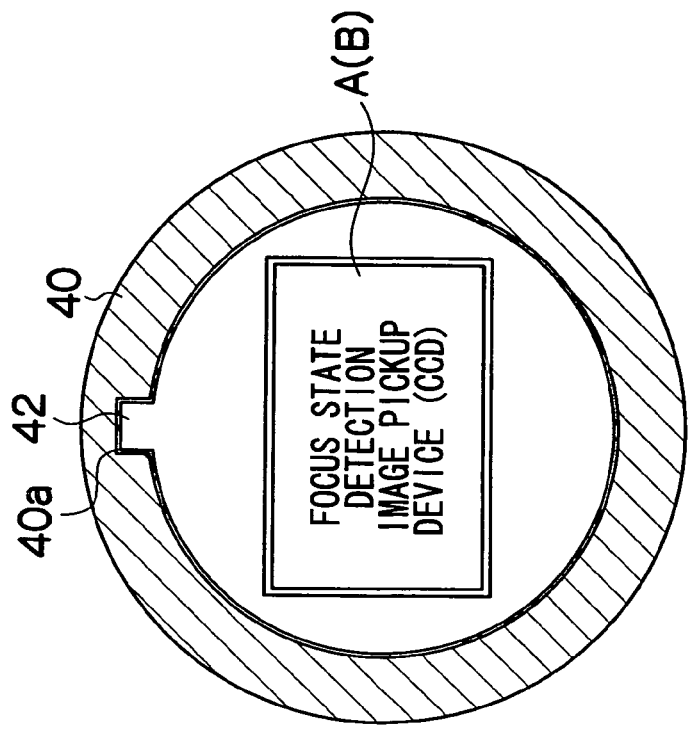
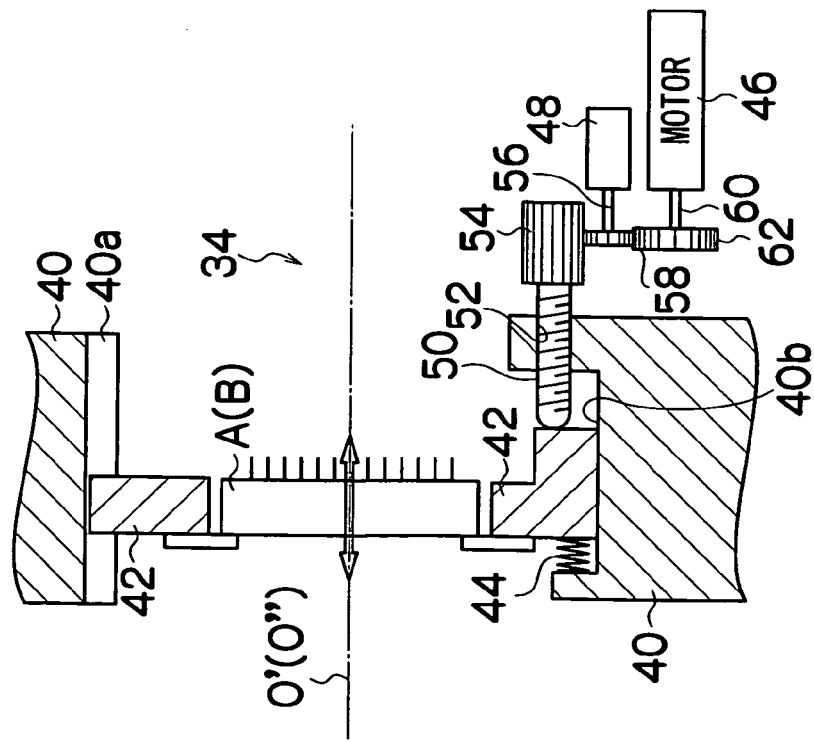
FIG.2A
FIG.2B

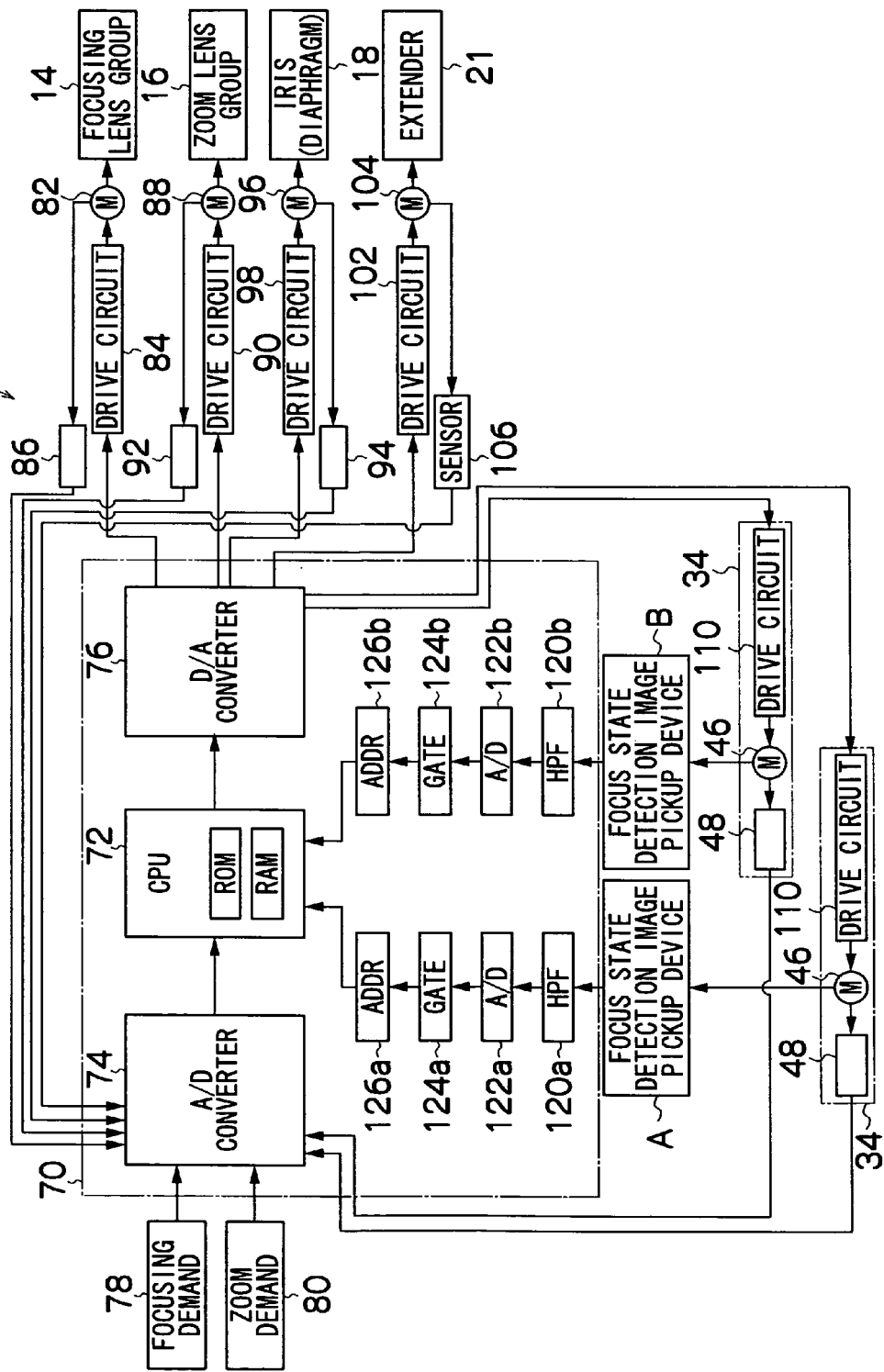

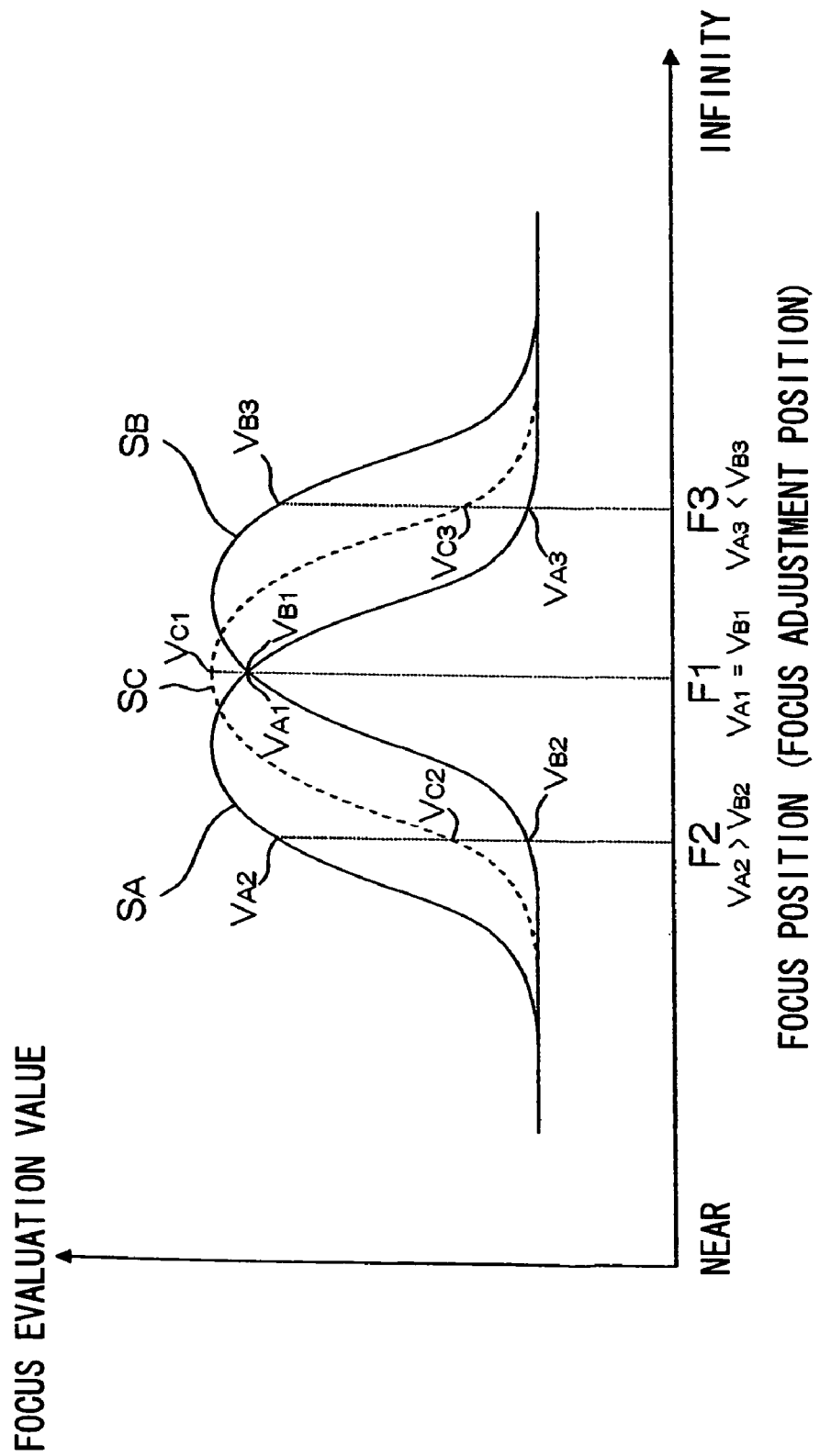

+ : FRONT FOCUS
0 : CORRECT FOCUS
− : REAR FOCUS

AUTOMATIC FOCUSING APPARATUS

BACKGROUND OF THE INVENTION

1. Field of the Invention

The present invention relates to an automatic focusing apparatus, and more particularly, to a technique used for detecting correct focus in automatic focusing control of photographic lens.

2. Description of the Related Art

Conventionally, in camera systems where an AF area for performing automatic focusing is configured within a photographing screen, either framing is performed so that a subject to be brought into focus enters the AF area, or a position of the AF area within the photographing screen is moved in accordance with the movement of the subject. However, in order to shoot a subject that is either fast-moving or has a drastically changing shape, taking shots while keeping the subject inside the AF area may prove difficult. In order to solve this problem, for example, technologies for tracking a subject within a photographing screen are disclosed in Japanese Patent No. 2663451 and Japanese Patent No. 2675807.

SUMMARY OF THE INVENTION

The technologies disclosed in the above-mentioned Japanese Patent No. 2663451 and Japanese Patent No. 2675807 involved moving a correct focus detection region according to a region configured within a photographing screen where either, a difference in average luminance levels between the inside and the outside of a region or a contrast thereof is maximum. However, with images having a small average luminance difference between a subject and a background, it was difficult to detect the position of the subject based on differences in average luminance levels to track the movement of the subject. In addition, since a region with a high contrast within a photographic screen was not necessarily the region in correct focus, there was the possibility of occurrences of malfunctions such as where the correct focus detection region moves to a subject with high contrast (such as an object, a wall or a billboard and the like with striped patterns) that is not the main subject to be tracked.

The present invention was made in consideration of these circumstances, and its object is to provide an automatic focusing apparatus capable of maintaining correct focus on a main subject even when the main subject moves within a photographing screen.

In order to achieve the above object, an automatic focusing apparatus according to a first aspect of the present invention comprises: a region configuring device which configures a main subject region including a main subject within a photographing screen; a focusing control device which controls focusing so that a focus state of the main subject included in the configured main subject region is a best focus state; a focus state obtaining device which divides the photographing screen into a plurality of regions and obtains a focus state from each region; a focus state storage device which stores the focus state obtained from each region; a movement detecting-device which references the stored focus state of each region to detect movement of a group of regions that are located either within the main subject region and its vicinity or within the main subject region and are in a best focus state; and a region moving device which moves the main subject region in accordance with the movement of the group of regions that are located either within the main subject region and its vicinity or within the main subject region and are in the best focus state.

In the automatic focusing apparatus according to the first aspect, storing a focus state (best focus, front focus, rear focus, blurring or the like) of each region enables accurate detection of a main subject and movement of a main subject region even when a subject with a higher contrast than the main subject exists.

In an automatic focusing apparatus according to a second aspect of the present invention, the focus state according to the first aspect comprises the respective states of best focus, front focus, rear focus or blurring. The second aspect limits the focus states of the first aspect.

An automatic focusing apparatus according to a third aspect of the present invention is the automatic focusing apparatus according to the first aspect or the second aspect, further comprising: a subject light separating device which separates a subject light for focus state detection from a main optical path which guides a subject light incident to a photographic lens to a visual image pickup device for obtaining an image signal for either recording or playback; an image pickup device which captures the separated subject light for focus state detection using a plurality of image capturing surfaces placed at positions with optical path lengths that differ from one another; and a focus evaluation value calculation device which calculates, for each region, focus evaluation values of the subject image based on image signals captured and obtained by the plurality of image capturing surfaces of the image pickup device; wherein the focus state obtaining device obtains the focus state of each region based on the focus evaluation values.

In the automatic focusing apparatus according to the third aspect, since the focus state of each region can be detected from the image signals of one field (or one frame), a main subject region can be moved at high speed and with high precision.

An automatic focusing apparatus according to a fourth aspect of the present invention is the automatic focusing apparatus according to the first to third aspects, further comprising a movement stopping device which stops the movement of the main subject region by the region moving device, wherein the region configuring device accepts configuration of the main subject region when the movement of the main subject region is stopped.

In the automatic focusing apparatus according to the fourth aspect, a main subject region can be manually configured, for example, when changing main subjects is desired during shooting.

An automatic focusing apparatus according to a fifth aspect of the present invention is the automatic focusing apparatus according to the first to third aspects, wherein operation of the region configuration device is preferentially accepted when the region configuration device is executed during the movement of the main subject region by the region moving device.

In the automatic focusing apparatus according to the fifth aspect, an interruption operation for configuring a main subject region can be performed manually while automatic tracking of the main subject region by the region moving device is in progress.

According to the present invention, even when a subject with a contrast that is higher than a main subject exists, the main subject can be accurately detected by storing the focus state (best focus, front focus, rear focus, blurring or the like) of each divided region of the photographing screen and moving the main subject region to a best focus position.

BRIEF DESCRIPTION OF THE DRAWINGS

FIGS. 2A and 2B are diagrams showing a drive apparatus for an automatic focusing system according to an embodiment of the present invention;

FIG. 3 is a block diagram showing a main configuration of a photographing lens 11;

FIG. 4 is a graph illustrating focus evaluation values;

DETAILED DESCRIPTION OF THE PREFERRED EMBODIMENTS

A preferred embodiment of an automatic focusing apparatus according to the present invention will now be described with reference to the accompanying drawings.

Figure 1:
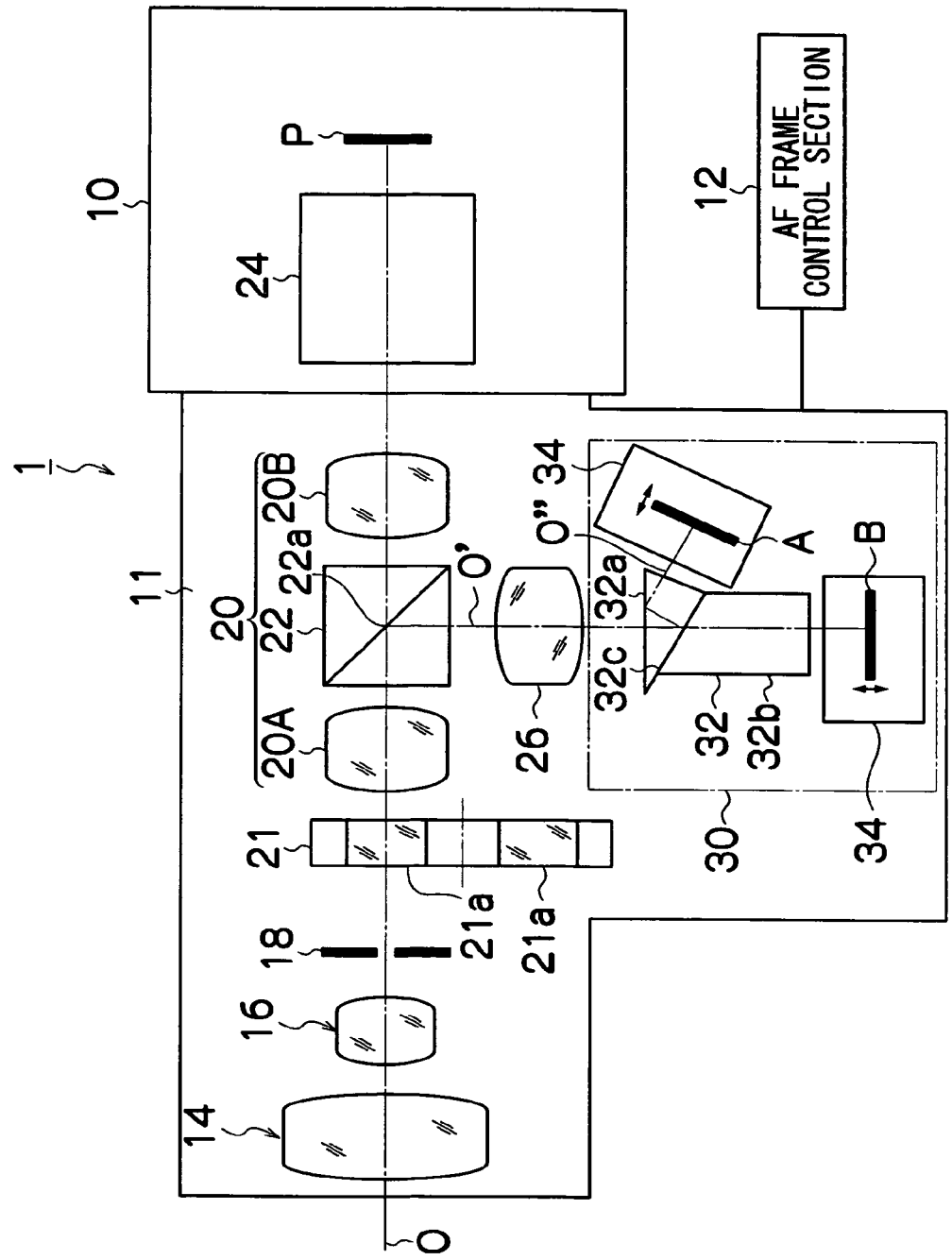
FIG. 1 is a block diagram showing a main configuration of a television camera system to which an automatic focusing system according to an embodiment of the present invention is applied.

FIG. 1 is a block diagram showing a main configuration of a television camera system to which an automatic focusing system according to an embodiment of the present invention is applied. The television camera system 1 shown in FIG. 1 comprises a camera main body 10, a photographing lens 11 and an AF frame operating section 12. The AF frame operating section 12 will be described later.

The camera main body 10 includes a visual image pickup device or the like for photographing images to be broadcasted, and outputting or recording image signals of a predetermined format onto a storage medium. The photographing lens 11 is detachably mounted onto a mount section of the camera main body 10.

An optical system of the photographing lens 11 comprises a focusing lens group 14, a zoom lens group 16, an iris (diaphragm) 18, a relay lens group 20, and an extender 21 or the like.

The extender 21 is provided between the iris 18 and the relay lens group 20, and comprises a plurality of lens units 21a capable of advancing and retreating in regards to an optical axis O. Each lens unit 21a consists of, for instance, a plurality of lenses at magnifications of 2×, 1×, 0.8× and the like.

The relay lens group 20 is composed of affront-side relay lens 20A and a rear-side relay lens 20B. A half mirror 22 for separating a subject light for focus state detection from a subject light incident via the photographic lens 11 is placed on the optical axis O between the front-side relay lens 20A and the rear-side relay lens 20B. The half mirror 22 is positioned so that its mirror surface 22a is roughly at 45 degrees to the optical axis O of the photographing lens 11, and reflects subject light passing through the front-side relay lens 20A at roughly a right angle, thereby dispersing as an optical axis O' from the visual image subject light.

The subject light transmitted through the half mirror 22 is projected as the visual image subject light from the rear end-side of the photographing lens 11, and enters an image capturing section 24 of the camera main body 10. While a detailed description of the image capturing section 24 will be omitted, subject light incident to the image capturing section 24 is separated into, for instance, light of the three colors of red, green and blue by a color separation optical system, and are then incident to image capturing surfaces of the visual image pickup device respectively provided for each color. Color visual images for broadcasting or the like are thereby photographed. The reference character P in the drawing designates a focus surface P, which is a position on the optical axis O that is optically equivalent to the photographing surface of the visual image pickup device.

The subject light reflected by the half mirror 22 proceeds as a focus state detection subject light along an optical axis O' roughly perpendicular to the optical axis O, and is incident to a focus state detecting section 30 via a formed image position changing lens 26.

The focus state detecting section 30 comprises a beam splitter 32 which bisects the focus state detection subject light, two focus state detection image pickup devices A and B to which the focus state detection subject light bisected by the beam splitter 32 enters, and drive apparatuses 34 which drive the focus state detection image pickup devices A and B.

The beam splitter 32 is composed of two prisms 32a and 32b. As described above, the focus state detection subject light separated from the subject light by the half mirror 22 proceeds along the optical axis O', and first enters the prism 32a. At the prism 32a, the focus state detection subject light is divided into a reflected light and a transmitted light by a half mirror 32c, and the reflected light proceeds along an optical axis O" to enter the focus state detection image pickup device A, while the transmitted light is incident to the prism 32b before entering the focus state detection image pickup device B.

For instance, CCDs (Charge Coupled Devices) for photographing black and white or color images are used as the focus state detection image pickup devices A and B.

The drive apparatuses 34 respectively drive the focus state detection image pickup devices A and B along the optical axes O" and O'. The drive apparatuses 34 respectively provided for the focus state detection image pickup devices A and B have similar structures. Therefore, the drive apparatus 34 for the focus state detection image pickup device A will now be described in detail.

FIGS. 2A and 2B are diagrams showing a:drive apparatus for an automatic focusing system according to an embodiment of the present invention. FIG. 2A is a side view, while FIG. 2B is a plan view. As shown in FIGS. 2A and 2B, the drive apparatus 34 comprises a holding frame 40 provided on a photographing lens 11 side, a frame 42 for supporting the focus state detection image pickup device A (B), a spring 44, a motor 46, a potentiometer 48, and a rotating shaft 50 with a male screw provided on its circumferential surface.

Guide grooves 40a and 40b, roughly parallel to the optical axis O' (O"), are formed on the holding frame 40. These guide grooves 40a and 40b support the frame 42 to move slidably in a direction parallel to the optical axis O' (O"). By sliding the frame 42 along the guide grooves 40a and 40b, the focus state detection image pickup device A supported by the frame 42 can be moved back and forth along the optical axis O' (O") (arrow in FIG. 2A).

A screw 44 that applies biasing force to the frame 42 is provided on an edge of the guiding groove 40b of the holding frame 40. Due to the screw 44, the frame 42 is constantly biased in a direction corresponding to the right side in FIG. 2A.

On the other hand, a support hole 52 which supports the rotating shaft 50 to be rotationally movable is formed on an edge of the guide groove 40b that faces the screw 44 of the holding frame 40. A female screw which screws on to the male screw of the rotating shaft 50 is formed on the inner circumferential surface of the support hole 52. A front end section (left in FIG. 2A) of the rotating shaft 50 is in contact with the frame 42, and biases the frame 42 against the biasing force of the screw 44 towards the left in FIG. 2A by the feeding effect of the screw caused by the rotational movement of the rotating shaft 50 and the translatory effect of the rotating shaft 50.

A gear 54 is mounted to a rear end section of the rotating shaft 50. A gear 58 mounted to a rotation detecting input shaft 56 of the potentiometer 48 meshes with the gear 54. In addition, the gear 58 meshes with a gear 62 mounted on an output shaft 60 of the motor 46.

In the drive apparatus 34 thus configured, the focus state detection image pickup device A (B) can be driven back and forth along the optical axis O' (O"), supported by the frame 42, by driving the motor 46. In addition, rotation of the gear 58 is detected by the potentiometer 48. The rotation detection by the potentiometer 48 enables detection of the position of the focus state detection image pickup device A (B), to be described in detail later.

FIG. 3 is a block diagram showing a main configuration of a photographing lens 11. Images photographed by the focus state detection image pickup devices A and B are inputted to a signal processing section 70. The signal processing section 70 detects focus states of the photographing lens 11 based on the inputted image signals, and comprises a central processing unit (CPU) 72 which functions as a control device, as well as an A/D converter 74, a D/A converter 76, a focusing demand 78, a zoom demand 80 and the like.

The CPU 72 functions both as a control device which controls according to a predetermined program devices such as the focusing lens group 14 or the zoom lens group 16 within the photographing lens 11, and as a control device for controlling the focus state detection image pickup devices A and B. The CPU 72 comprises a ROM storing a control program and various data tables necessary for control or calculations, a RAM to be used as a working storage area, and the like.

Focus of the photographing lens 11 is controlled by manual focusing (MF) or automatic focusing (AF).

During MF, a focusing demand 78 outputs focusing demand data which instructs a moving position of the focusing lens group 14 via the A/D converter 74 to the CPU 72 in response to an amount of rotational operation of a focus knob, not shown, provided on a periphery of the photographing lens 11. Based on the focusing demand data, the CPU 72 outputs a control signal to a drive circuit 84 of a focusing motor 82, and drives the focusing lens group 14 of the photographing lens 11. At the CPU 72, movement speed of the focusing lens group 14 and the like is calculated based on the loaded focusing demand data and positional data of the focusing lens group 14 inputted via the A/D converter 74 from a focusing potentiometer 86.

On the other hand, a zoom demand 80 outputs zoom demand data which instructs moving speed of the zoom lens group 16 via the AID converter 74 to the CPU 72 in response to a direction and an amount of rotation of a zoom ring which is provided to be rotationally movable on a periphery of the photographing lens 11. Based on the zoom demand data, the CPU 72 outputs a control signal to a drive circuit 90 of a zoom motor 88, and drives the zoom lens group 16 of the photographing lens 11. At the CPU 72, movement of the zoom lens group 16 and the like is calculated based on the loaded zoom demand data and positional data of the zoom lens group 16 inputted via the A/D converter 74 from a potentiometer 92.

The CPU 72 also calculates a drive amount of an iris motor 96 based on an diaphragm value data inputted from a potentiometer 94 for the iris 18 via the A/D converter 74, and an iris control signal provided by the camera main body 10, and outputs a control signal for the iris motor 96 to a drive circuit 98 of the iris motor 96 via the D/A converter 76.

The CPU 72 further outputs a lens unit change signal for the extender 21 to a drive circuit 102 of the extender 21 via the D/A converter 76, depending on operation of an extender select lever, not shown, provided on the exterior of the photographing lens 11. Receiving this signal, the drive circuit 102 drives a drive motor 104 of the extender 21, and advances a selected lens unit onto the optical axis O (refer to FIG. 1). The reference numeral 106 designates a sensor for detecting the type of the lens unit advanced onto the optical axis O.

During AF, images photographed by the focus state detection image pickup devices A and B are outputted to the CPU 72 of the signal processing section 70. The CPU 72 detects the focus state of the photographing lens 11 based on visual image signals obtained from the focus state detection image pickup devices A and B. The CPU 72 next outputs a control signal to the drive circuit 84 of the focusing motor 82 based on the detected focus state via the D/A converter 76, and performs AF control of the photographing lens 11. This AF control will be described later.

A motor 46 of the drive apparatus 34 of the focus state detection image pickup device A is activated based on a drive signal from a drive circuit 110. The drive circuit 110 drives the motor 46 based on a control signal outputted from the D/A converter 76 of the signal processing section 70. Thus, the movement of the focus state detection image pickup device A is controlled.

The potentiometer 48 detects the position of the focus state detection image pickup device A based on the number of rotations of the input shaft 56 (refer to FIG. 2), and outputs the positional data thereof to the A/D converter 74 of the signal processing section 70.

The drive apparatus 34 of the focus state detection image pickup device B is similar in configuration to that of the focus state detection image pickup device A, and the motor 46 is driven based on a control signal outputted from the D/A converter 76 to control movement of the focus state detection image pickup device B. In addition, the position of the focus state detection image pickup device B is detected by the potentiometer 48, and positional data thereof is outputted to the A/D converter 74 of the signal processing section 70.

Processing for focus state detection will now be described specifically. Images of a subject captured by the focus state detection image pickup devices A and B are respectively outputted to the signal processing section 70 as video signals with a predetermined format, and are inputted to the CPU 72 after being converted to focus evaluation value (VA, VB) signals that indicate sharpness or contrast of the images by bypass filters 120a and 120b, A/D converters 122a and 122b, gate circuits 124a and 124b, and adding machines 126a and 126b of the signal processing section 70. For instance, when CCDs which photograph black and white images are used as the focus state detection image pickup devices A and B, video signals outputted from the focus state detection image pickup devices A and B to the signal processing section 70 become luminance signals indicating luminance of each pixel composing each screen.

Processing for obtaining the focus evaluation values VA and VB will now be explained. The video signals outputted from the focus state detection image pickup devices A and B are respectively inputted to the bypass filters 120a and 120b, and their high frequency components are extracted. The signals of the high frequency components extracted by the bypass filters 120a and 120b are respectively converted into digital signals by the A/D converters 122a and 122b. Next, among the one screen's worth (one field's worth) of the digital signals of the images photographed by the focus state detection image pickup devices A and B, only the digital signals corresponding to pixels within a predetermined focus area (for instance, the center portion of the screen) are respectively extracted by the gate circuits 124a and 124b. The values of digital, signals of the extracted range are added by the adding machines 126a and 126b. A total sum of the values of the high frequency components of the video signals within the predetermined focus area is thereby obtained, and the obtained values become the focus evaluation values VA and VB, which indicate a level of sharpness of the image within the predetermined focus area.

Various synchronization signals are applied from a synchronization'signal generating circuit, not shown, to the focus state detection image pickup devices A and B and the respective circuits such as the gate circuits 124a and 124b to achieve synchronization of processing performed at each circuit. In addition, a vertical synchronization signal (V signal) for each field of the video signal is applied from the synchronization signal generating circuit to the CPU 72.

Based on the focus evaluation values VA and VB obtained in this manner, the CPU 72 detects a current focus state of the photographing lens 11 in relation to the photographing surface (the focus surface P shown in FIG. 1) of the visual image pickup device.

Effects of the automatic focusing apparatus according to the present invention will now be described. First, a description will be provided on focus evaluation values. FIG. 4 is a graph illustrating focus evaluation values. In FIG. 4, a horizontal axis represents focus positions of the photographing lens 12, while a vertical axis represents focus evaluation values. Curved lines SA and SB indicated by continuous lines represent focus evaluation values respectively obtained from the automatic focusing image pickup devices A and B, while a curved line SC indicated by a dotted line is a focus evaluation value obtained from an visual image pickup device (P). On the curved line SC, a position F1 where the focus evaluation value reaches maximum (maximal) is the correct focus position of the visual image pickup device C.

When the focus position of the photographing lens 11 is set to the correct focus position F1, the focus evaluation values obtained from each focus state detection image pickup devices A and B are values VA1 and VB1 corresponding to the position F1 on the respective curved lines SA and SB. In this case, as for the relationships between each focus evaluation value, the focus evaluation value VA1 obtained from the focus state detection image pickup device A and the focus evaluation value VB1 obtained from the focus state detection image pickup device B are equal to each other, while a focus evaluation value VC1 of the focus state detection image pickup device C assumes a different value (VA1=VB1, VA1≠VC1, VB1≠VC1). Therefore, it can be-understood, that when-the focus evaluation value VA1 obtained from the focus state detection image pickup device A and the focus evaluation value VB1 obtained from the focus state detection image pickup device B are equal to each other, while a focus evaluation value VC1 of a focus state detection image pickup device C assumes:a different value, the focus position of the photographing lens 11 is set at the correct-focus position F1.

On the other hand, when the focus position of the photographing lens 11 is set to a position F2 on the near side of the correct focus position F1, the focus evaluation values obtained from each focus state detection image pickup devices A and B are values VA2 and VB2 corresponding to the position F2 on the respective curved lines SA and SB. In this case, as for the relationship between the focus evaluation value VA2 obtained from the focus state detection image pickup device A and the focus evaluation value VB2 obtained from the focus state detection image pickup device B, the focus evaluation value VA2 obtained from the focus state detection image pickup device A is greater than the focus evaluation value VB2 obtained from the focus state detection image pickup device B (VA2>VB2). Therefore, it can be understood that when the focus evaluation value VA2 obtained from the focus state detection image pickup device A is greater than the focus evaluation value VB2 obtained from the focus state detection image pickup device B, the focus position of the photographing lens 11 is set to the near side of the correct focus position F1, i.e., at a front-focus position.

Similarly, when the focus position of the photographing lens 11 is set to a position F3 on the infinity side of the correct focus position F1, the focus evaluation values obtained from each focus state detection image pickup devices A and B are values VA3 and VB3 corresponding to the position F3 on the respective curved lines SA and SB. In this case, as for the relationship between the focus evaluation value VA3 obtained from the focus state detection image pickup device A and the focus evaluation value VB3 obtained from the focus state detection image pickup device B, the focus evaluation value VA3 obtained from the focus state detection image pickup device A is smaller than the focus evaluation value VB3 obtained from the focus state detection image pickup device B (VA3<VB3). Therefore, it can be understood that when the focus evaluation value VA3 obtained from the focus state detection image pickup device A is smaller than the focus evaluation value VB3 obtained from the focus state detection image pickup device B, the focus position of the photographing lens 11 is set to the infinity side of the correct focus position F1, i.e., at a rear focus position.

As the zoom lens group 16 of the photographing lens 11 is operated to shift the focal length to a wide angle side (i.e., shortened), the amount of displacement of the focus position corresponding to the optical path length increases, and the curved lines SA and SB become more spaced in relation to the focus position. When a difference in focus evaluation values is not detected, the positions of the focus state detection image pickup devices A and B can be moved so that the optical path length difference decreases, making the curved lines SA and SB approach each other, and thereby enabling detection of a focus state.

As seen, the automatic focusing apparatus according to the present embodiment enables optimum configuration of optical path lengths by moving focus state detection image pickup devices back and forth along the direction of an optical axis of a focus state detection subject light, thereby constantly enabling detection of appropriate focus states.

Figure 5:
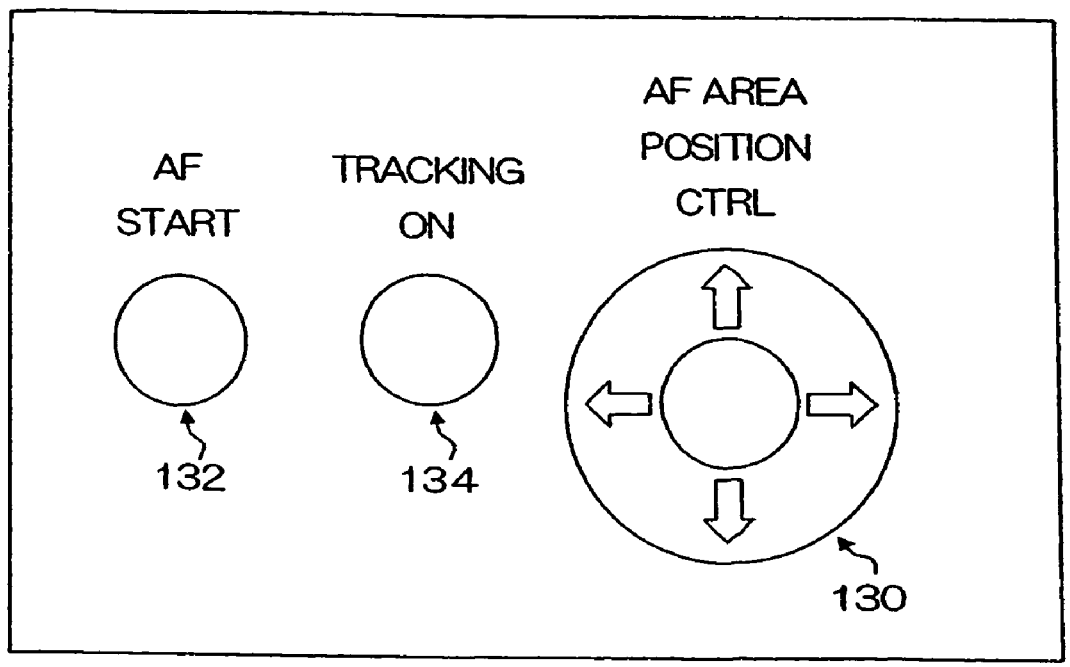
FIG. 5 is a plan view showing an AF operating section 12.

The AF frame operating section 12 will now be described. FIG. 5 is a plan view showing the AF operating section 12. As shown in FIG. 5, the AF operating section 12 comprises a joystick 130, an AF start switch 132 and a tracking starting switch 134. The joystick 130 is a member that is operated to designate AF area positions within the photographing screen. The AF start switch 132 is a member that is operated to perform automatic focusing so that a subject within the AF area designated by the joystick 130 achieves best focus. The tracking starting switch 134 is a switch for initiating an automatic tracking mode that automatically tracks the AF area in accordance with the movement of the subject in best focus in the photographing screen.

Figure 6:
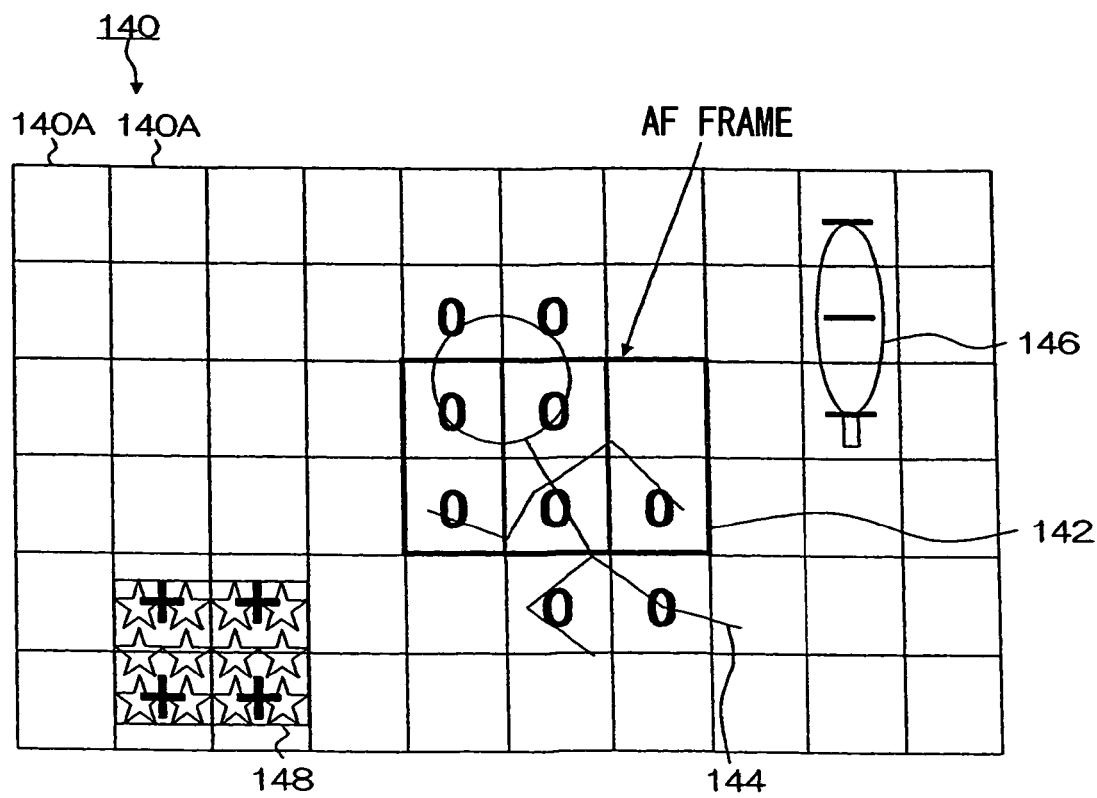
FIG. 6 is a diagram showing a photographing screen.

FIG. 6 is a diagram showing a photographing screen. As shown in FIG. 6, the photographing screen 140 is divided into a plurality of regions 140A. Reference numeral 142 designates an AF frame, which indicates an AF area within the photographing screen. The automatic focusing apparatus according to the present embodiment respectively detects a focus state for each region 140A. In FIG. 6, a "0" sign is displayed for a region 140A that includes a subject in best focus, a "+" sign is displayed for a region 140A that includes a subject in front focus, and a region 140A that includes a subject in rear focus is displayed by a "−" sign. A region 140A displayed by none of the signs "0", "+" or "−" is either a region with a blurred subject or a region without a subject.

Figure 7:
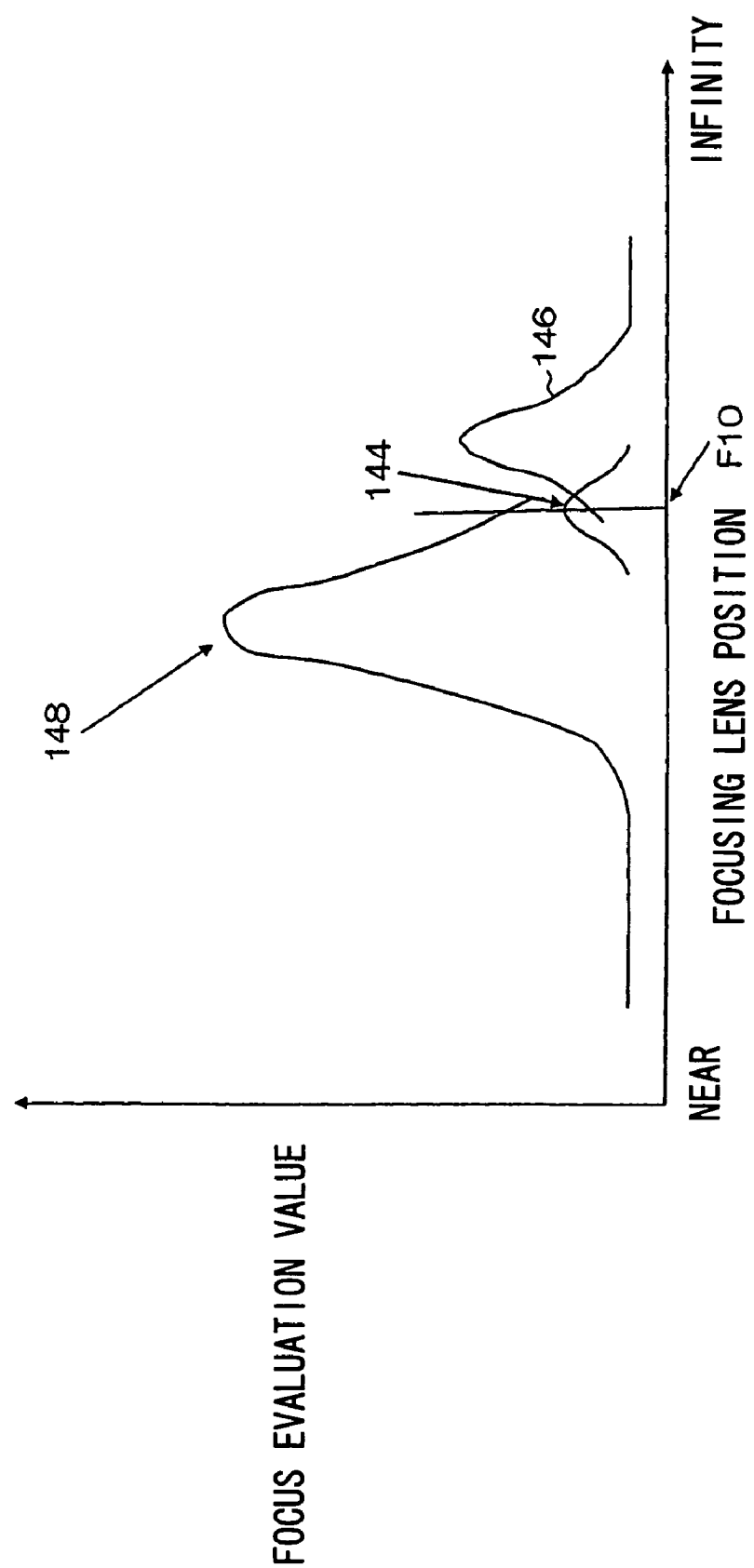
FIG. 7 is a graph illustrating a focus state of a subject within the photographing screen of FIG. 6.

In the present embodiment, as shown in FIG. 6, an input is first provided by operating the joystick 130 to move the AF frame 142 to the position of a main subject 144 (person). When the AF start switch 132 is pressed, automatic focusing is performed so that the main subject 144 in the AF frame 142 comes into best focus. At this point, as shown in FIGS. 6 and 7, a group of regions including the subject 144 (person) near the AF frame 142 is now in best focus, and a group of regions including a subject 146 (tree), shown to the right of the subject 144 in FIG. 6, is now in rear focus, while a subject 148 (a subject with high contrast, such as an multi-colored object with a significant difference in luminance), shown to the left of the subject 144 in FIG. 6, is now in front focus. Each focus state of the regions 140A is detected by the CPU 72 and stored in a RAM.

Next, when the tracking starting switch 134 is pressed and the mode is set to automatic tracking mode, the focus state of each region 140A stored in the RAM by the CPU 72 is referenced, and a movement of a group of regions in best focus (in FIG. 6, the group of regions displayed by "0" signs in the AF frame 142 and its vicinity) is detected. Then, the AF frame 142 moves in accordance with the movement of a group of regions in best focus, while automatic focusing is simultaneously performed so that the subject 144 in the AF frame 142 comes into best focus.

In the present embodiment, for instance, when the tracking starting switch 134 is pressed during automatic tracking mode, the automatic tracking mode is deactivated, thereby stopping the movement of the AF frame 142 that has been moving in accordance with the movement of the main subject 144. In this case, the position of the AF frame 142 can be manually designated using the joystick 130.

In addition, when the joystick 130 is operated during automatic tracking mode, automatic tracking can be arranged to terminate to preferentially accept manual operation by the joystick 130.

FIG. 7 is a graph illustrating a focus state of a subject within the photographing screen of FIG. 6. A horizontal axis of FIG. 7 represents focus positions of the focusing lens group 14, while a vertical axis represents focus evaluation values. In FIG. 7, the focus evaluation values of the three subjects 144 to 148 respectively detected for each region 140A are shown on the same graph. As shown in FIG. 7, although the focus evaluation value of the main subject 144 is lower than those of the subjects 146 and 148, by respectively detecting a focus state (best focus, front focus, rear focus, blurring or the like) for each region 140A, the AF frame 142 can be tracked so that the main subject 144 comes into best focus.

Figure 8:
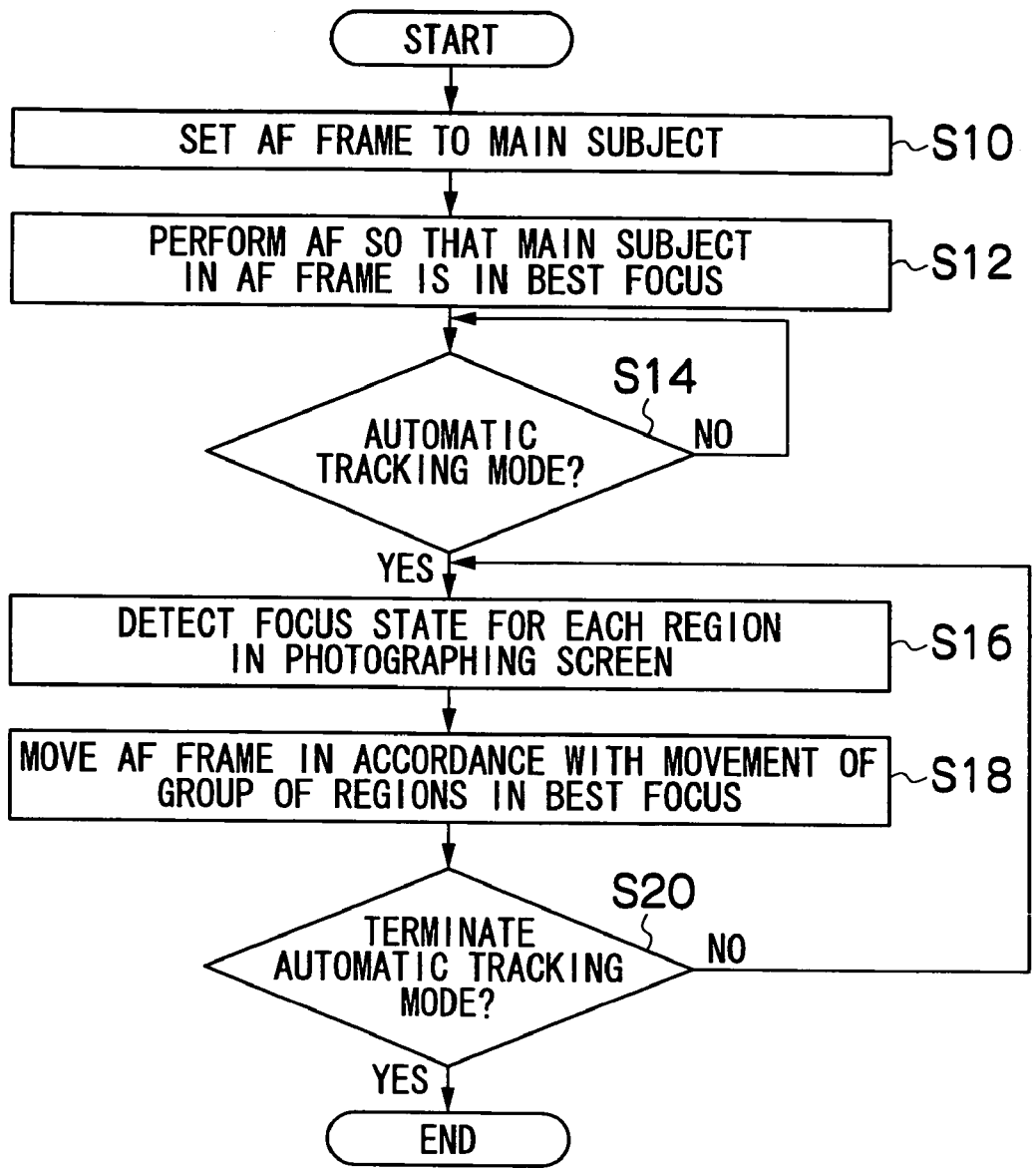
FIG. 8 is a flowchart showing a flow of processing by a CPU 72 during automatic tracking mode.

Next, a flow of processing during automatic tracking mode will be described with reference to FIG. 8. FIG. 8 is a flowchart showing a flow of processing by a CPU 72 during automatic tracking mode. First, an input is provided by operating the joystick 130 to configure the AF frame 142 to overlap with the main subject 144 (step S10). The step S10 can be arranged so that the size and shape of the AF frame 142 is adjustable according to the size and shape of the main subject 144. Then, when the AF start switch 132 is pressed, automatic focusing is performed so that the main subject 144 in the AF frame 142 comes into best focus (step S12).

Next, if not set to automatic tracking mode (No in step S14), the process returns to step S10 to continue manual configuration of the AF frame. On the other hand, if the tracking starting switch has been pushed and the automatic tracking mode is set (Yes in step S14), a focus state is respectively detected for each region 140A in the photographing screen 140 and stored in the RAM (step S16). Then, the focus state of each region 140A stored in the RAM are referenced, and a movement of a group of regions in best focus (in FIG. 6, the group of regions displayed by "0" signs) is detected. Then, the AF frame 142 moves in accordance with the movement of a group of regions in best focus (step S18), while automatic focusing is simultaneously performed so that the subject 144 in the AF frame 142 comes into best focus (step S20). In step S18, the AF frame 142 can be arranged, for instance, to move so as to entirely include the group of regions in best focus, or to move so that the center (or the center of gravity) of the AF frame 142 is congruent with the center of gravity of the group of regions in best focus. In addition, when the size of the group of regions in best focus changes, the size of the AF frame 142 can be arranged to change accordingly.

Then, if photographing under the automatic tracking mode is ongoing (No in step S22), the process returns to step S16. On the other hand, if the tracking starting switch 134 is pressed and either the automatic tracking mode is deactivated or photographing is concluded (Yes in step S22), the above processing is terminated.

According to the present embodiment, by respectively detecting a focus state (best focus, front focus, rear focus, blurring or the like) for each region 140A in the photographing screen 140, the main subject 144 can be accurately detected and the AF frame 142 can be tracked even when a subject with a higher contrast than the subject 144 exists.

In the above-described step S18, when the group of regions in best focus in the photographing screen 140 separates into a plurality of groups, for instance, it is conceivable that a plurality of subjects (persons) in the AF frame 142 has started to move independently from each other. In such cases, the AF frame 142 is preferably moved in accordance with a group of regions with the biggest or smallest size, or with a group of regions with a high contrast. In addition, the step S18 may be arranged so that an indication prompting manual configuration of the AF frame 142 using the joystick 130 is displayed.

In addition, when zooming is performed during the automatic tracking mode, the present embodiment may be arranged so that the size of the AF frame 142 is adjusted in accordance with such zooming.

Furthermore, while the present embodiment has been configured so that, a focus state is respectively detected for each region 140A in the photographing screen 140 by providing a plurality of focus state detection image pickup devices A and B with different optical path lengths, the present invention is not limited to this configuration. For instance, wobbling of the focusing lens group 14 may be performed to detect focus evaluation values, thereby detecting a focus state for each region 140A.

Additionally, the configuration of the automatic focusing apparatus according to the present embodiment is not limited to the above. While the present embodiment is configured so that the focus state detection image pickup devices A and B are driven by motors 46, a configuration in which the focus state detection image pickup devices A and B are driven by an actuator using piezoelectric elements or the like is also possible.

Moreover, while the present embodiment has been described with respect to an example where the automatic focusing apparatus of the present invention is applied to the photographing lens of a television camera system for purposes of broadcasting or the like, the scope of application of the present invention is not limited to these purposes. For instance, the present invention can also be applied to the photographing lenses of conventional cameras such as digital cameras.

What is claimed is:

1. An automatic focusing system comprising:
   a region configuring device which configures a main subject region including a main subject within a photographing screen;
   a focusing control device which controls focusing so that a focus state of the main subject included in the configured main subject region is a best focus state;
   a focus state obtaining device which divides the photographing screen into a plurality of regions and obtains a focus state from each region;
   a focus state storage device which stores the focus state obtained from each region;
   a movement detecting device which references the stored focus state of each region to detect the movement of a group of regions that are located either within the main subject region and its vicinity or within the main subject region and are in a best focus state; and
   a region moving device which moves the main subject region in accordance with the movement of the group of regions that are located either within the main subject region and its vicinity or within the main subject region and are in the best focus state.

2. The automatic focusing apparatus according to claim 1, wherein
   the focus state includes the respective states of best focus, front focus, rear focus or blurring.

3. The automatic focusing apparatus according to claim 2, further comprising:
   a subject light separating-device which separates a subject light for focus state detection from a main optical path which guides a subject light incident to a photographic lens to a visual image pickup device for obtaining an image signal for either recording or playback;
   an image pickup device which captures the separated subject light for focus state detection using a plurality of image capturing surfaces placed at positions with optical path lengths that differ from one another; and
   a focus evaluation value calculation device which calculates, for each region, a focus evaluation value of the subject image based on image signals captured and obtained by the plurality of image capturing surfaces of the image pickup device, wherein the focus state obtaining device obtains a focus state of each region based on the focus evaluation values.

4. The automatic focusing apparatus according to claim 3, further comprising:
   a movement stopping device which stops the movement of the main subject region by the region moving device, wherein
   the region configuring device accepts configuration of the main subject region when the movement of the main subject region is stopped.

5. The automatic focusing apparatus according to claim 3, wherein
   operation of the region configuration device is preferentially accepted when the region configuration device is executed during the movement of the main subject region by the region moving device.

6. The automatic focusing apparatus according to claim 2, further comprising:
   a movement stopping device which stops the movement of the main subject region by the region moving device, wherein
   the region configuring device accepts configuration of the main subject region when the movement of the main subject region is stopped.

7. The automatic focusing apparatus according to claim 2, wherein
   operation of the region configuration device is preferentially accepted when the region configuration device is executed during the movement of the main subject region by the region moving device.

8. An automatic focusing apparatus comprising:
   a region configuring device which configures a main subject region including a main subject within a photographing screen;
   a focusing control device which controls focusing so that a focus state of the main subject included in the configured main subject region is a best focus state;
   a focus state obtaining device which divides the photographing screen into a plurality of regions and obtains a focus state from each region;
   a focus state storage device which stores the focus state obtained from each region;
   a movement detecting device which references the stored focus state of each region to detect the movement of a group of regions that are located either within the main subject region and its vicinity or within the main subject region and are in a best focus state;
   a region moving device which moves the main subject region in accordance with the movement of the group of regions that are located either within the main subject region and its vicinity or within the main subject region and are in the best focus state;
   a subject light separating device which separates a subject light for focus state detection from a main optical path which guides a subject light incident to a photographic lens to a visual image pickup device for obtaining an image signal for either recording or playback;
   an image pickup device which captures the separated subject light for focus state detection using a plurality of image capturing surfaces placed at positions with optical path lengths that differ from one another; and
   a focus evaluation value calculation device which calculates, for each region, a focus evaluation value of the subject image based on image signals captured and obtained by the plurality of image capturing surfaces of the image pickup device,
   wherein the focus state obtaining device obtains a focus state of each region based on the focus evaluation values.

9. The automatic focusing apparatus according to claim 8, further comprising:
   a movement stopping device which stops the movement of the main subject region by the region moving device, wherein
   the region configuring device accepts configuration of the main subject region when the movement of the main subject region is stopped.

10. The automatic focusing apparatus according to claim 8, wherein
    operation of the region configuration device is preferentially accepted when the region configuration device is executed during the movement of the main subject region by the region moving device.

11. An automatic focusing apparatus comprising:
a region configuring device which configures a main subject region including a main subject within a photographing screen;
a focusing control device which controls focusing so that a focus state of the main subject included in the configured main subject region is a best focus state;
a focus state obtaining device which divides the photographing screen into a plurality of regions and obtains a focus state from each region;
a focus state storage device which stores the focus state obtained from each region;
a movement detecting device which references the stored focus state of each region to detect the movement of a group of regions that are located either within the main subject region and its vicinity or within the main subject region and are in a best focus state;
a region moving device which moves the main subject region in accordance with the movement of the group of regions that are located either within the main subject region and its vicinity or within the main subject region and are in the best focus state; and
a movement stopping device which stops the movement of the main subject region by the region moving device, wherein
the region configuring device accepts configuration of the main subject region when the movement of the main subject region is stopped.

12. An automatic focusing apparatus comprising:
a region configuring device which configures a main subject region including a main subject within a photographing screen;
a focusing control device which controls focusing so that a focus state of the main subject included in the configured main subject region is a best focus state;
a focus state obtaining device which divides the photographing screen into a plurality of regions and obtains a focus state from each region;
a focus state storage device which stores the focus state obtained from each region;
a movement detecting device which references the stored focus state of each region to detect the movement of a group of regions that are located either within the main subject region and its vicinity or within the main subject region and are in a best focus state; and
a region moving device which moves the main subject region in accordance with the movement of the group of regions that are located either within the main subject region and its vicinity or within the main subject region and are in the best focus state,
wherein operation of the region configuration device is preferentially accepted when the region configuration device is executed during the movement of the main subject region by the region moving device.

* * * * *